US009430891B2

(12) United States Patent
Lin

(10) Patent No.: US 9,430,891 B2
(45) Date of Patent: Aug. 30, 2016

(54) WIRELESS CONTROL METHOD, WIRELESS HOST DEVICE AND SWITCH CONTROL DEVICE

(71) Applicant: GEMTEK TECHNOLOGY CO., LTD., Hsinchu County (TW)

(72) Inventor: Che-Wei Lin, Hsinchu County (TW)

(73) Assignee: GEMTEK TECHNOLOGY CO., LTD., Hsinchu County (TW)

( * ) Notice: Subject to any disclaimer, the term of this patent is extended or adjusted under 35 U.S.C. 154(b) by 189 days.

(21) Appl. No.: 14/328,831

(22) Filed: Jul. 11, 2014

(65) Prior Publication Data

US 2015/0179005 A1 Jun. 25, 2015

(30) Foreign Application Priority Data

Dec. 25, 2013 (TW) ............................ 102148214 A

(51) Int. Cl.
*G05B 23/00* (2006.01)
*B60R 25/00* (2013.01)
*G07C 9/00* (2006.01)
*G08B 21/00* (2006.01)

(52) U.S. Cl.
CPC ....... *G07C 9/00309* (2013.01); *G07C 9/00571* (2013.01); *G07C 2009/00769* (2013.01); *G07C 2009/00793* (2013.01); *G07C 2209/63* (2013.01)

(58) Field of Classification Search
CPC ........ G05B 23/00; B60R 25/00; G07C 9/00; G07C 9/00007
USPC .............................. 340/5.6, 5.64, 5.7, 686.2
See application file for complete search history.

(56) References Cited

U.S. PATENT DOCUMENTS 7,023,341 B2 * 4/2006 Stilp .................... G06K 7/0008 340/545.1
7,446,644 B2 * 11/2008 Schaffzin ........... G07C 9/00182 340/5.6
8,319,605 B2 * 11/2012 Hassan .................. G01C 17/38 340/10.2
8,886,252 B2 * 11/2014 Luke ................... H04M 1/6041 455/550.1
9,007,173 B2 * 4/2015 McIntyre ........... G07C 9/00309 340/5.6
9,057,210 B2 * 6/2015 Dumas ............... G07C 9/00571
9,128,575 B2 * 9/2015 Lee ......................... G06F 3/044
9,143,009 B2 * 9/2015 Fitzgibbon .............. H02J 17/00
9,196,104 B2 * 11/2015 Dumas ............... G07C 9/00571
2004/0174247 A1 * 9/2004 Rodenbeck ........ G07C 9/00103 340/5.64
2008/0129446 A1 6/2008 Vader
2012/0280783 A1 11/2012 Gerhardt et al.
2013/0176107 A1 7/2013 Dumas et al.
2013/0237193 A1 9/2013 Dumas et al.

FOREIGN PATENT DOCUMENTS

JP 09-165954 6/1997
TW 201205081 A 2/2012

* cited by examiner

*Primary Examiner* — Nam V Nguyen
(74) *Attorney, Agent, or Firm* — CKC & Partners Co., Ltd.

(57) ABSTRACT

A wireless control method includes steps as follows. A connection with an authentication device is built through a directional antenna of a wireless host device. Information, which is received by the wireless host device from the authentication device, is transmitted to a switch control device through a data transmission interface. The switch control device is utilized to control a switch according to the information, which is received by the wireless host device from the authentication device. The present invention also discloses a wireless host device and a switch control device.

19 Claims, 3 Drawing Sheets

100

WIRELESS CONTROL METHOD, WIRELESS HOST DEVICE AND SWITCH CONTROL DEVICE

RELATED APPLICATIONS

This application claims priority to Taiwan Application Serial Number 102148214, filed Dec. 25, 2013, which is herein incorporated by reference.

BACKGROUND

1. Field of Invention

The present invention relates to a control method, a host device and a switch control device. More particularly, the present invention relates to a wireless control method, a wireless host device and a switch control device.

2. Description of Related Art

Most doors may be installed with door locks or switches to prevent others entering or manage people to pass in and out. In general, such door lock or switch may be unlocked utilizing a key or a magnetic card. However, each door lock or switch has its specified key or magnetic card to unlock it.

Above all, there is a need to unlock a door lock or a switch more easily.

SUMMARY

According to one embodiment of this invention, a wireless host device is provided. The wireless host device includes a directional antenna, a data transmission unit and a processing unit. The processing unit is electrically connected with the directional antenna and the data transmission unit. The directional antenna receives signals in a direction. The data transmission unit builds a connection with a switch control device through a data transmission interface. The switch control device is configured to control a switch.

According to another embodiment of this invention, a switch control device is provided. The switch control device includes a data transmission unit, a switch and a processing unit. The processing unit is electrically connected with the data transmission unit and the switch. The data transmission unit builds a connection with a wireless host device through a data transmission interface. The switch is disposed in a zone. The processing unit controls the switch according to information received from the wireless host device.

According to another embodiment of this invention, a wireless control method is provided. The wireless control method includes the following steps: a connection with an authentication device is built through a directional antenna of a wireless host device. Information, which is received by the wireless host device from the authentication device, is transmitted to a switch control device through a data transmission interface. The switch control device is utilized to control a switch according to the information, which is received by the wireless host device from the authentication device.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
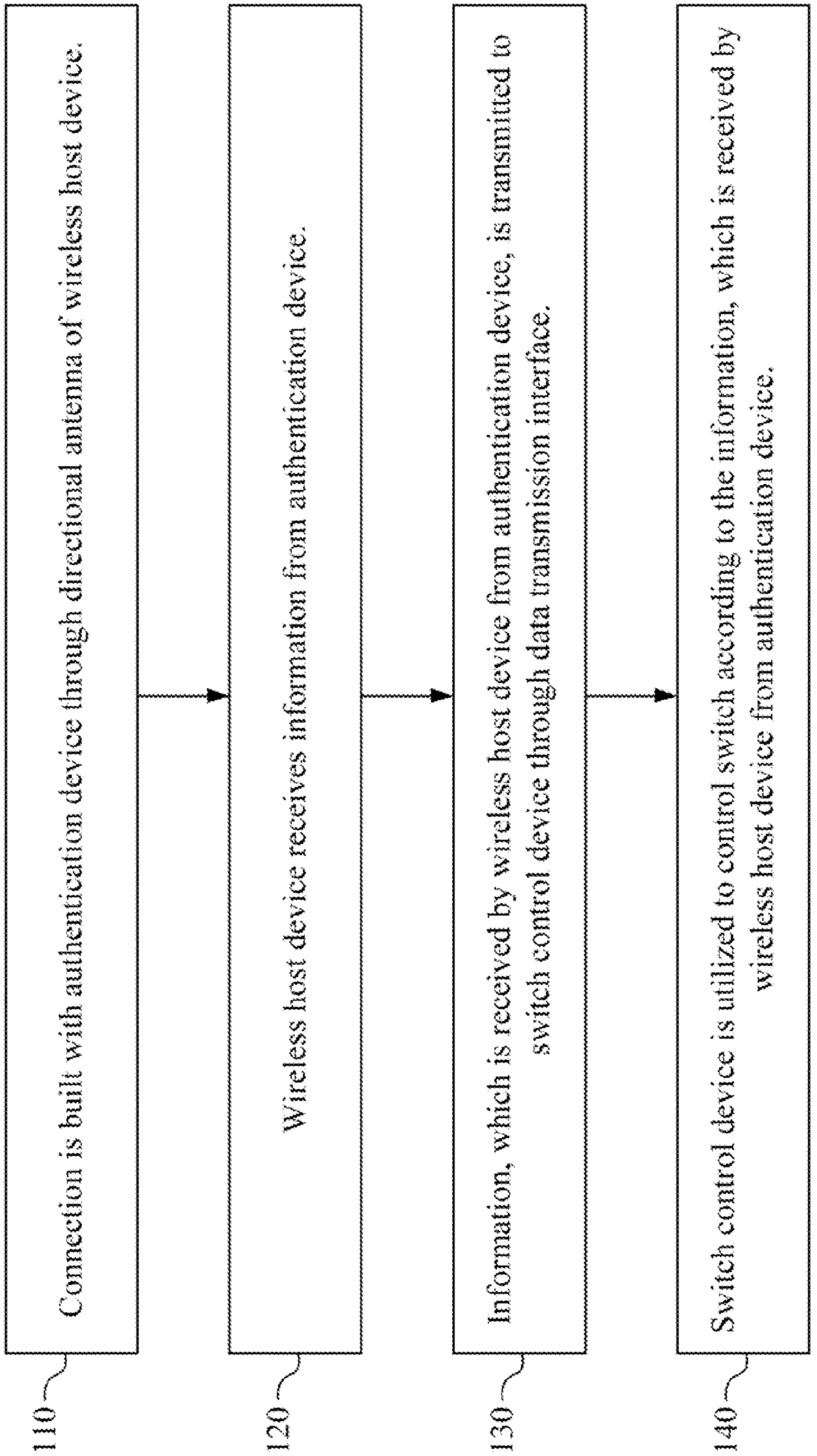
FIG. 1 is a flow diagram of a wireless control method according to one embodiment of this invention.

Reference will now be made in detail, to the present embodiments of the invention, examples of which are illustrated in the accompanying drawings. Wherever possible, the same reference numbers are used in the drawings and the description to refer to the same or like parts.

Figure 2:
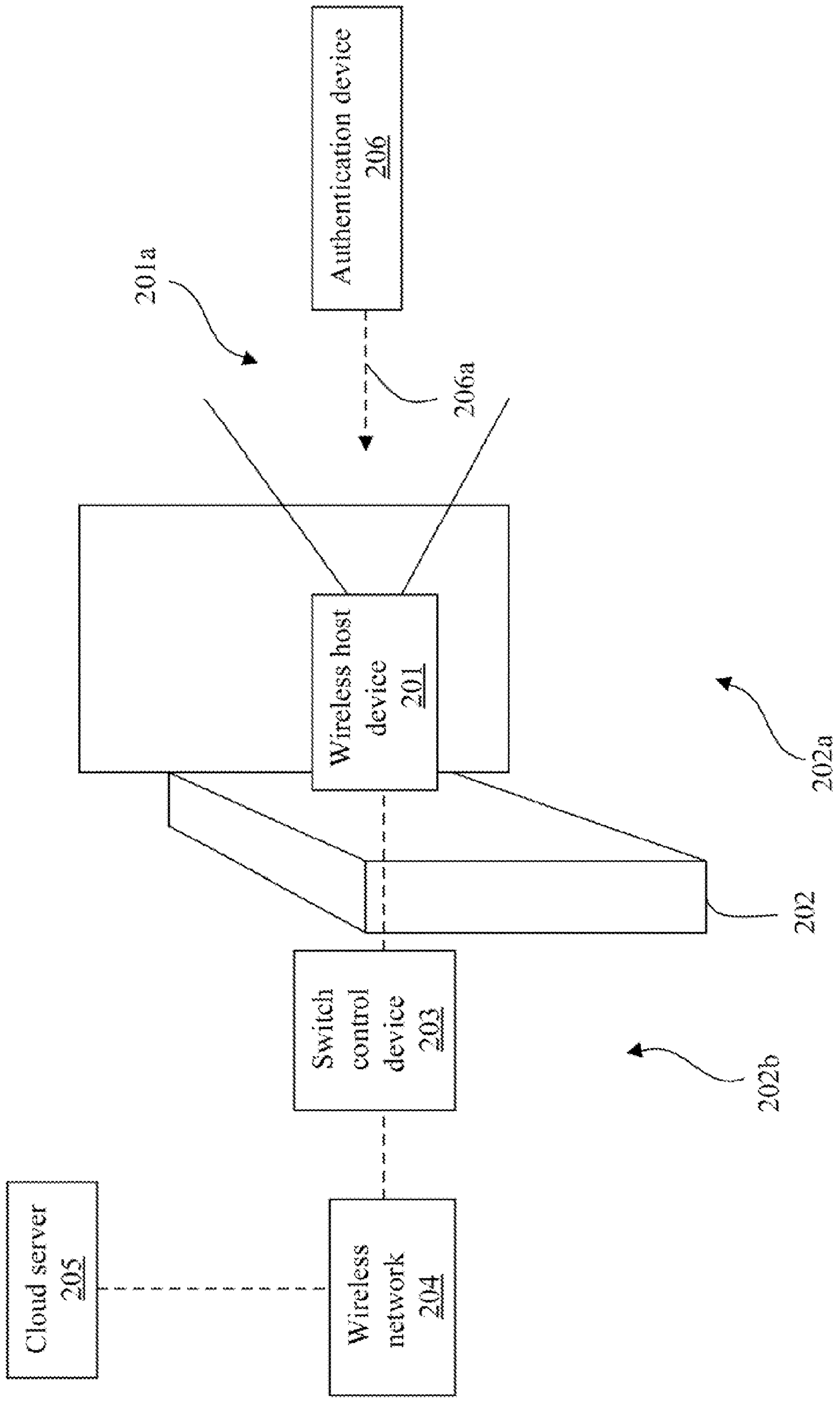
FIG. 2 is an embodiment of a scenario applying the wireless control method.

FIG. 1 is a flow diagram of a wireless control method according to one embodiment of this invention. The wireless control method may take the form of a computer program product stored on a non-transitory computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs), digital versatile disc read only memories (DVD-ROMs), and Blu-ray Disc read only memories (BD-ROMs); magnetic storage devices such as hard disk drives (HDDs); and solid-state disks (SSDs). FIG. 2 is an embodiment of a scenario applying the wireless control method. Referring to both FIG. 1 and FIG. 2, the wireless control method 100 includes the following steps:

When a connection with an authentication device 206 is built through a directional antenna of a wireless host device 201 (step 110), the wireless host device 201 receives information from the authentication device 206. The information received from the authentication device 206 may include authentication information of the authentication device 206, information sensed by a gravity sensor (G-sensor), which is also know as an accelerometer sensor, of the authentication device 206 or any other type of information. The information sensed by the gravity sensor of the authentication device 206 may be information about a moving direction (for example, 206*a*). The authentication device 206 may be any possible device having a G-sensor. The directional antenna of the wireless host device 201 receives signals in one specified direction. In some embodiments of this invention, the directional antenna of the wireless host device 201 may be installed at a position to make the directional antenna receive signals from a position 202*a* outside a door 202. In detail, the reception range 201*a* of the directional antenna of the wireless host device 201 may be adjusted, such that the reception range 201*a* may be at the position 202*a* outside the door 202. Therefore, when the authentication device 206 is at a position 202*b* inside the door 202, the directional antenna of the wireless host device 201 would not build a connection with the authentication device 206, such that a switch (such as a door lock on the door 202) would not be controlled mistakenly. When the authentication device 206 is in the reception range 201*a* of the directional antenna of the wireless host device 201, the directional antenna of the wireless host device 201 can detect the authentication device 206 and build a connection with the same. In addition, the directional antenna of the wireless host device 201 may utilize a short-range wireless protocol (for example, Bluetooth technology) for the connection to the authentication device 206. Therefore, when the authentication device 206 is at the position far away from the switch to be controlled (such as the door lock on the door 202), the connection between the directional antenna of the wireless host device 201 and the authentication device 206 would not be built, such that the switch would not be controlled when the user of the authentication device 206 is not near the door 202. Moreover, the authentication device 206 may execute an application (APP) program to build a connection with the directional antenna of the wireless host device 201 when the authentication device 206 is in the reception range 201*a* of the directional antenna of the wireless host device 201. After the connection is built, the APP program may drive the authentication device 206 to automatically transmit its authentication information or the information sensed by its G-sensor to the wireless host device 201. In addition, the directional antenna of the wireless host device 201 may be set to a sleep status when it has not received any signal for a period of time, and the directional antenna of the wireless host device 201 may be wakened up when a specified signal is received. Therefore, the power consumption of the wireless host device 201 may be further reduced.

At step 130, information, which is received by the wireless host device 201 from the authentication device 206, is transmitted to a switch control device 203 through a data transmission interface. In one embodiment of this invention, the wireless host device 201 and the switch control device 203 are respectively disposed in two different blocks in a zone. For example, the wireless host device 201 may be disposed at the block 202*a* out of the door 202, and the switch control device 203 may be disposed at the block 202*b* inside the door 202. In this embodiment, the data transmission between the wireless host device 201 and the switch control device 203 may be performed utilizing a wireless data transmission protocol, such as radio frequency (RF), third generation of mobile telecommunications technology (3G), Long Term Evolution (LTE) or any other wireless data transmission protocol. In addition, in some embodiments of this invention, when there is an object (for example, the door 202) disposed between the blocks, at which the wireless host device 201 and the switch control device 203 are disposed, high-frequency signals may be utilized for the wireless data transmission protocol to transmit data between the wireless host device 201 and the switch control device 203. Industrial scientific & medical (ISM) radio bands or any other type of high-frequency band may be utilized for the high-frequency bands. Therefore, even if the door 202 is made of iron, the wireless host device 201 can still transmit information to the switch control device 203. In some other embodiments of this invention, the wireless host device 201 can be disposed in the same block (for example, the block 202*b*, which is inside the door 202.) In this embodiment, the wireless host device 201 and the switch control device 203 can be integrated into one device or can be two separated devices. In addition, a connection may be built between the wireless host device 201 and the switch control device 203 through a wired or wireless data transmission protocol to transmit information received from the authentication device 206.

At step 140 the switch control device 203 is utilized to control a switch according to the information, which is received by the wireless host device 201 from the authentication device 206. For example, the switch controlled by the switch control device 206 may be a door lock disposed on the door 202. Hence, in some embodiments of this invention, when information sensed by a gravity sensor (G-sensor) of the authentication device 206 (for example, information of a moving direction 206*a*) matches information of a preset moving direction, the switch control device 203 may be utilized to control the switch (door lock) on the door 202 correspondingly (for example, unlock.) In addition, whether the authentication information, which is received from the authentication device 206, passes authentication may be further determined, so as to generate a determination result. Then, the switch control device 203 controls the switch correspondingly according to the determination result. After the door 202 is unlocked, the user of the authentication device 206 can move into the block 202*b* inside the door 202.

In some other embodiments of this invention, after the door 202 is unlocked, the door 202 may be open automatically, such that the user of the authentication device 206 can move into the block 202*b* inside the door 202. Therefore, the user just has to carry the authentication device 206 and move in a specified direction (for example, move toward the door 202), and then the door 202 may be unlocked correspondingly without taking out any key. In addition, in some embodiments, the door 202 may be unlocked only when the G-sensor of the authentication device 206 senses a moving from the block 202*a* toward the door 202, which avoid that the door 202 is unlocked at a wrong timing.

Moreover, when the switch control device 203 determines that the authentication information does not pass authentication or the authentication device 206 is not moving from the block 202*a* toward the door 202, the wireless host device 201 may keep receiving information from the authentication device 206.

In some embodiments of this invention, when the switch control device 203 determines that the authentication information passes authentication or the information sensed by the G-sensor of the authentication device 206 matches information of a preset moving direction (for example, moving from the block 202*a* toward the door 202), the switch control device 203 may be triggered to execute a corresponding function, such as door bell ringing or any other corresponding function. Different corresponding functions may be executed as the users differ. For example, when the authentication information of the authentication device 206 represents a guest and the information sensed by the G-sensor of the authentication device 206 matches information of the preset moving direction, the switch control device 203 may drive a door bell to ring, such that a user inside the door 202 may be informed. For another example, when the door 202 is installed at the entrance of a garage, the authentication information of the authentication device 206 represents a host and the information sensed by the G-sensor of the authentication device 206 matches information of the preset moving direction, the switch control device 203 may be triggered to open the door 202. Therefore, the host just needs to carry the authentication device 206 to drive toward the door 202, such that the door may be open automatically.

In some other embodiments of this invention, the switch control device 203 can perform authentication through a cloud server 205. Hence, the wireless control method 100 may includes the following steps: the switch control device 203 may transmit the authentication information of the authentication device 206 to the cloud server 205 through a wireless network 204 for determining if the authentication information passes authentication. In some embodiments of this invention, the authentication information of the authentication device 206 may include identification information of the authentication device 206. The cloud server 205 may determine if the identification information of the authentication device 206 is in a preset list for determining if the authentication information passes authentication. Moreover, other parameters may be further taken into consideration for determining if the authentication is passed. For example, a cleaner can enter the block 202*b* inside the door 202 at a specified period, and, as a result, the authentication information of the authentication device 206 for a cleaner can pass the authentication only at the specified period for cleaning up. Any other authentication method may be utilized to perform the authentication to the identification information of the authentication device 206, which should not be limited in this disclosure.

In still another embodiment of this invention, the switch control device 203 may perform the authentication to the authentication information of the authentication device 206. For such case, the switch control device 203 may provide a user interface for users to easily set that which authentication information can pass the authentication or to set other functions.

In another embodiment of this invention, when the APP program executed by the authentication device 206 is at a setting process, a user may be required to carry the authentication device 206 to move from the block 202*a* toward the door 202, such that the G-sensor of the authentication device 206 can sense and generate the information about moving from the block 202*a* toward the door 202, which is then taken as the information of the preset moving direction.

Figure 3:
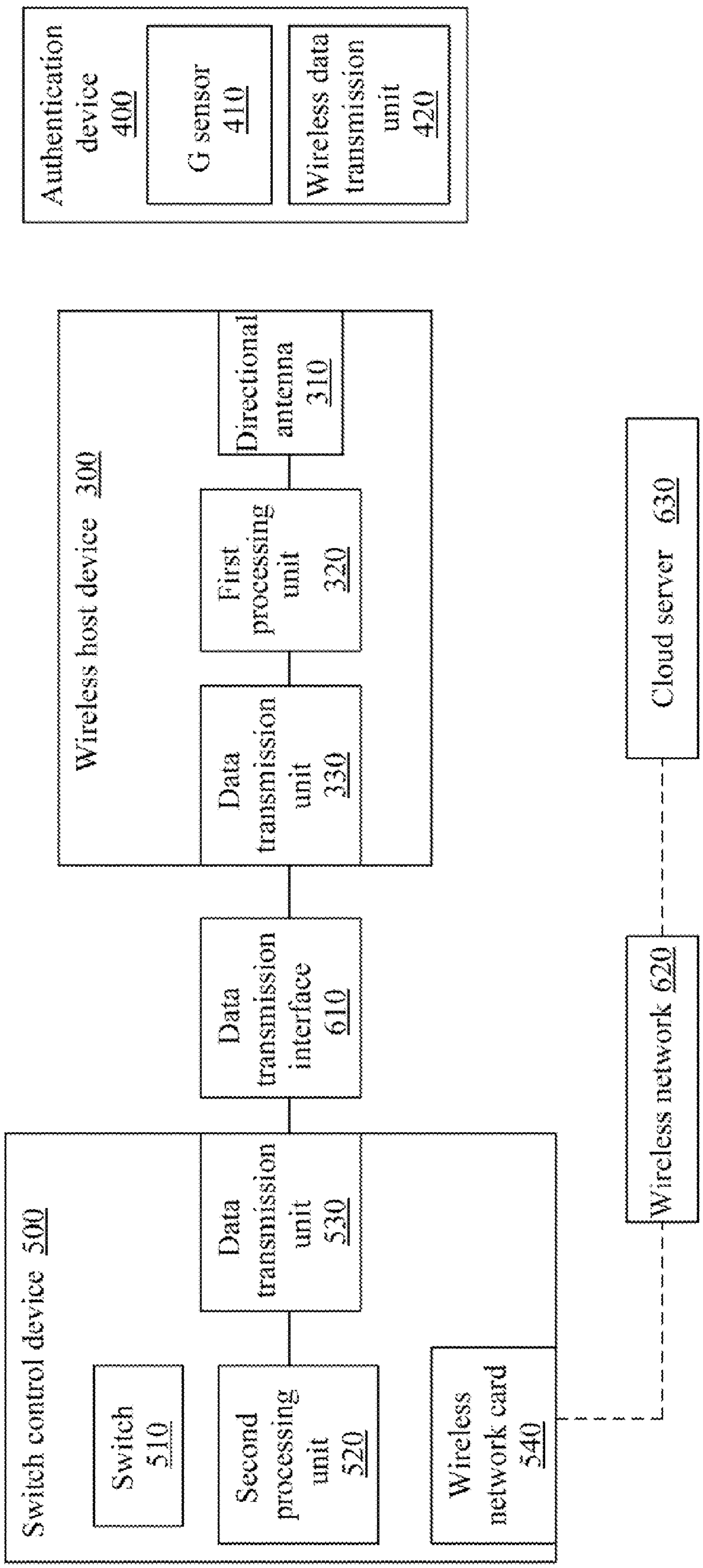
FIG. 3 illustrates a block diagram of a wireless control system according to one embodiment of this invention.

Referring to FIG. 3, a block diagram is described to illustrate a wireless control system according to one embodiment of this invention. The wireless control system includes a wireless host device 300, a data transmission interface 610 and a switch control device 500.

The wireless host device 300 includes a directional antenna 310, a first processing unit 320 and a data transmission unit 330. The first processing unit 320 is electrically connected with the directional antenna 310 and the data transmission unit 330. The switch control device 500 includes a switch 510, a second processing unit 520 and a data transmission unit 530. The second processing unit 520 is electrically connected with the switch 510 and the data transmission unit 530. The switch 510 is installed in a zone. For example, the switch 510 may be installed on a door of the zone.

In some embodiments of this invention, the wireless host device 300 and the switch control device 500 may be implemented in one single device. In such embodiment, the first processing unit 320 and the second processing unit 520 may be implemented utilizing one single physical processing unit. In some other cases, the first processing unit 320 and the second processing unit 520 may indicate separated processing units. The data transmission unit 330 can build a connection to the data transmission unit 530 through the data transmission interface 610 utilizing a wire.

In some other embodiments of this invention, the wireless host device 300 and the switch control device 500 may indicate two independent devices. In such case, the data transmission unit 330 can build a connection to the data transmission unit 530 through the data transmission interface 610, which transmits data wirelessly. The data transmission interface 610 may transmit data following a wireless data transmission protocol, such as RF, 3G, LTE or any other wireless data transmission protocol. Such wireless data transmission protocol may utilize ISM radio bands or any other type of high-frequency band to transmit data. Therefore, even if an iron door is positioned between the wireless host device and the switch control device 500, they can still transmit data to each other.

The first processing unit 320 and the second processing unit 520 may be a Central Processing Unit (CPU), a control unit, a micro processor or any other hardware to execute instructions.

The directional antenna 310 may be installed at a position to make the directional antenna 310 receive signals from a specified direction. For example, the directional antenna 310 may be installed at a position to make the directional antenna 310 receive signals only from a position outside the door installed with the switch 510. Therefore, when the authentication device 400 is inside the door, the directional antenna 310 would not build a connection with the authentication device 400, such that the switch 510 would not be controlled mistakenly. In other words, when the first processing unit 320 builds a connection with the authentication device 400 through the directional antenna 310, it is indicated that the authentication device 400 is in the reception direction of the directional antenna 310 (for example, outside the door). Then, the first processing unit 320 can receive information from the authentication device 400. The information received from the authentication device 400 may include authentication information or information sensed and generated by a G-sensor 410 of the authentication device 400. In addition, the directional antenna 310 may utilize a short-range wireless protocol (for example, Bluetooth technology) for the connection to the authentication device 400. Therefore, when the authentication device 400 is at the position far away from the zone installed with the switch 510, the directional antenna 310 would not detect the authentication device 400, such that the switch 510 would not be controlled mistakenly. Moreover, the authentication device 400 may keep executing an APP program to drive its wireless data transmission unit 420 to detect if there is any device available. When the authentication device 400 is in the reception range of the directional antenna 310, the APP program may drive the wireless data transmission unit 420 to build a connection with the directional antenna 310. After the connection is built, the APP program may drive the wireless data transmission unit 420 to automatically transmit its authentication information or the information sensed by the G-sensor 410 to the wireless host device 300. In addition, when the directional antenna 310 has not received any signal for a period of time, the first processing unit 320 may set the directional antenna 310 to a sleep status. When a specified signal is received, the first processing unit 320 may waken up the directional antenna 310. Therefore, the power consumption of the wireless host device 300 may be further reduced.

Then, the first processing unit 320 drives the data transmission unit 330 to transmit the information, which is received from the authentication device 400 (for example, the authentication information of the authentication device 400 or the information sensed and generated by the G-sensor 410), to the switch control device 500 through the data transmission interface 610.

The second processing unit 520 drives the data transmission unit 530 to receive the information, which is received by the wireless host device 300 from the authentication device 400, through the data transmission interface 610. Then, the second processing unit 520 controls the switch 510 according to the information received from the wireless host device 300. For example, when the second processing unit 520 determines that the authentication information passes authentication and the information sensed by the G-sensor 410 matches information of a preset moving direction (for example, a direction from a position outside the door toward the door), the second processing unit 520 may control the switch 510 correspondingly (such as unlock the switch 510.) In some embodiments of this invention, after the switch 510 is unlocked, a user of the authentication device 400 can open the door. In some other embodiments of this invention, after the switch 510 is unlocked, the door may be open automatically, such that the user can enter the block inside the door. Therefore, the user just has to carry the authentication device 400 and move in a specified direction (for example, move toward the door), and then the door may be unlocked correspondingly without taking out any key. In addition, in some embodiments, the door may be unlocked only when the G-sensor 410 of the authentication device 400 senses a moving from outside toward the door, which avoid that the door is unlocked at a wrong timing.

In some embodiments of this invention, when the switch control device 500 determines that the authentication information passes authentication or the information sensed by the G-sensor 410 matches information of a preset moving direction (for example, moving from outside toward the door), the second processing unit 520 may further trigger the switch control device 500 to execute a corresponding function, such as door bell ringing or any other corresponding function. Different corresponding functions may be executed as the users differ. For example, when the authentication information of the authentication device 400 represents a guest and the information sensed by the G-sensor 410 matches information of the preset moving direction, the second processing unit 520 may drive a door bell to ring, such that a user inside the door may be informed. For another example, when the door is installed at the entrance of a garage, the authentication information of the authentication device 400 represents a host and the information sensed by the G-sensor 410 matches information of the preset moving direction, the second processing unit 520 may trigger the switch control device 500 to open the door. Therefore, the host just needs to carry the authentication device 400 to drive toward the door, such that the door may be open automatically.

In some embodiments of this invention, the switch control device may further include a wireless network card 540, which is electrically connected to the second processing unit 520. The wireless network card 540 may apply a wireless network protocol to build a connection to a wireless network 620. Hence, the second processing unit 520 may drive the wireless network card 520 to transmit the authentication information of the authentication device 400 to a cloud server 600 through a wireless network 630 for determining if the authentication information passes authentication. In some embodiments of this invention, the authentication information of the authentication device 400 may include identification information of the authentication device 400. The cloud server 630 may determine if the identification information of the authentication device 400 is in a preset list for determining if the authentication information passes authentication. Moreover, other parameters may be further taken into consideration for determining if the authentication is passed. For example, a cleaner can enter inside the door 202 at a specified period, and, as a result, the authentication information of the authentication device 400 for a cleaner can pass the authentication only at the specified period for cleaning up. Any other authentication method may be utilized to perform the authentication to the identification information of the authentication device 400, which should not be limited in this disclosure.

In still another embodiment of this invention, the second processing unit 520 of the switch control device 500 may perform the authentication to the authentication information of the authentication device 400. For such case, the second processing unit 520 of the switch control device 500 may provide a user interface for users to easily set that which authentication information can pass the authentication or to set other functions.

In another embodiment of this invention, when the APP program executed by the authentication device 400 is at a setting process, a user may be required to carry the authentication device 400 to move in a specified direction (for example, from outside toward the door), such that the G-sensor 410 of the authentication device 400 can sense and generate the information about the preset moving direction for the second processing unit 520 to perform the determination.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A wireless host device, comprising:
- a directional antenna, wherein the directional antenna receives signals in a direction;
- a data transmission unit, wherein the data transmission unit builds a connection with a switch control device through a data transmission interface, and the switch control device is configured to control a switch; and
- a processing unit, electrically connected with the directional antenna and the data transmission unit;
- wherein the processing unit is configured to receive information sensed by a gravity sensor (G-sensor) of an authentication device, and control the switch corresponding to the fact that whether the information sensed by the G-sensor matches information of a preset moving direction.

2. The wireless host device of claim 1, wherein the switch is disposed in a zone, the wireless host device is disposed in a first block of the zone, and the switch control device is disposed in a second block of the zone.

3. The wireless host device of claim 2, wherein the data transmission unit utilizes a wireless data transmission protocol for data transmission.

4. The wireless host device of claim 2, wherein the data transmission unit utilizes high frequency for the data transmission when an object is disposed between the first block and the second block.

5. The wireless host device of claim 1, wherein when the processing unit builds a connection with the authentication device in the direction through the directional antenna, the processing unit receives information from the authentication device to be a factor for the switch control device to control the switch.

6. The wireless host device of claim 5, wherein the information received from the authentication device comprises authentication information.

7. The wireless host device of claim 5, wherein the directional antenna utilizes a short-range wireless protocol for the connection between the processing unit and the authentication device.

8. A switch control device, comprising:

a data transmission unit, wherein the data transmission unit builds a connection with a wireless host device through a data transmission interface;

a switch disposed in a zone; and a processing unit, electrically connected with the data transmission unit and the switch, wherein the processing unit controls the switch according to information received from the wireless host device;

wherein the information received from the wireless host device comprises information sensed by a gravity sensor (G-sensor) of an authentication device, and the processing unit controls the switch corresponding to the fact that whether the information sensed by the G-sensor matches information of a preset moving direction.

9. The switch control device of claim 8, wherein:

the information received from the wireless host device comprises authentication information of the authentication device; and when the processing unit determines that the authentication information passes authentication, the processing unit controls the switch correspondingly.

10. The switch control device of claim 9, further comprising:

a wireless network card, electrically connected with the processing unit, wherein the wireless network card builds a connection with a wireless network, wherein the processing unit drives the wireless network card to transmit the authentication information to a cloud server through the wireless network for determining if the authentication information passes the authentication.

11. The switch control device of claim 8, wherein the processing unit determines that the information sensed by the G-sensor matches the information of the preset moving direction when the information sensed by the G-sensor corresponds to information about moving towards the zone.

12. The switch control device of claim 8, wherein:

the information received from the wireless host device comprises authentication information of the authentication device; and when the processing unit determines that the authentication information passes authentication and the information sensed by the G-sensor matches information of the preset moving direction, the processing unit further trigger the switch control device to execute a corresponding function.

13. A wireless control method, comprising:

building a connection with an authentication device through a directional antenna of a wireless host device;

transmitting information, which is received by the wireless host device from the authentication device, to a switch control device through a data transmission interface, wherein the information received from the authentication device comprises information sensed by a gravity sensor (G-sensor) of the authentication device; and utilizing the switch control device to control a switch according to the information, which is received by the wireless host device from the authentication device, wherein the step of controlling the switch comprises: controlling the switch corresponding to the fact that whether the information sensed by the G-sensor matches information of a preset moving direction.

14. The wireless control method of claim 13, wherein the information, which is received by the wireless host device from the authentication device, comprises authentication information of the authentication device.

15. The wireless control method of claim 14 further comprising:

transmitting the authentication information from the switch control device to a cloud server through a wireless network for determining whether the authentication information passes authentication so as to generate a determination result, wherein the switch control device controls the switch correspondingly according to the determination result.

16. The wireless control method of claim 13, wherein it is determined that the information sensed by the G-sensor matches the information of the preset moving direction when the information sensed by the G-sensor corresponds to information about moving towards the zone.

17. The wireless control method of claim 13, wherein the switch is disposed in a zone, the wireless host device is disposed in a first block of the zone, and the switch control device is disposed in a second block of the zone.

18. The wireless control method of claim 13, wherein the directional antenna utilizes a short-range wireless protocol for the connection to the authentication device.

19. The wireless control method of claim 13, wherein the information, which is received by the wireless host device from the authentication device, comprises authentication information of the authentication device, and the wireless control method further comprises:

triggering the switch control device to execute a corresponding function when it is determined that the authentication information passes authentication and the information sensed by the G-sensor matches information of the preset moving direction.

* * * * *